United States Patent
Schnerr et al.

(10) Patent No.: US 9,371,037 B2
(45) Date of Patent: Jun. 21, 2016

(54) LIGHTING DEVICE OF A MOTOR VEHICLE

(75) Inventors: Michael Schnerr, Reutlingen-Sondelfingen (DE); Dirk Blum, Tuebingen (DE)

(73) Assignee: AUTOMOTIVE LIGHTING REUTLINGEN GMBH, Reutlingen (DE)

( * ) Notice: Subject to any disclaimer, the term of this patent is extended or adjusted under 35 U.S.C. 154(b) by 690 days.

(21) Appl. No.: 12/975,582

(22) Filed: Dec. 22, 2010

(65) Prior Publication Data

US 2011/0148301 A1 Jun. 23, 2011

(30) Foreign Application Priority Data

Dec. 22, 2009 (DE) .......................... 10 2009 060 791

(51) Int. Cl.
*B60Q 11/00* (2006.01)
*H05B 33/08* (2006.01)

(52) U.S. Cl.
CPC ............ *B60Q 11/005* (2013.01); *H05B 33/089* (2013.01); *H05B 33/0845* (2013.01); *H05B 33/0848* (2013.01); *H05B 33/0854* (2013.01)

(58) Field of Classification Search
USPC ....... 315/185 S, 247, 291, 307–309, 312–326
See application file for complete search history.

(56) References Cited

U.S. PATENT DOCUMENTS

| | | | |
|---|---|---|---|
| 6,153,980 A | 11/2000 | Marshall et al. | |
| 7,262,752 B2 * | 8/2007 | Weindorf | 345/82 |
| 7,663,323 B2 * | 2/2010 | Telefont | 315/291 |
| 7,710,050 B2 * | 5/2010 | Preston et al. | 315/312 |
| 8,232,735 B2 * | 7/2012 | Shteynberg et al. | 315/247 |
| 2007/0159750 A1 * | 7/2007 | Peker et al. | 361/93.1 |
| 2009/0013570 A1 | 1/2009 | Grajcar | |
| 2009/0230883 A1 * | 9/2009 | Haug | 315/297 |
| 2010/0134018 A1 * | 6/2010 | Tziony et al. | 315/122 |
| 2010/0194274 A1 * | 8/2010 | Hoogzaad | 315/51 |
| 2011/0068702 A1 * | 3/2011 | van de Ven et al. | 315/186 |
| 2011/0084615 A1 * | 4/2011 | Welten | 315/152 |

(Continued)

FOREIGN PATENT DOCUMENTS

| | | |
|---|---|---|
| DE | 103 58 447 B3 | 5/2005 |
| DE | 10 2006 049 291 A1 | 4/2007 |
| DE | 10 2006 056 712 A1 | 6/2008 |

(Continued)

OTHER PUBLICATIONS

Jan. 22, 2010 German Search Report for Application No. 10 2009 060 791.9-31.

(Continued)

*Primary Examiner* — Tuyet Vo
(74) *Attorney, Agent, or Firm* — Howard & Howard Attorneys PLLC

(57) ABSTRACT

A light module (5, 6) for a lighting device (1) of a motor vehicle includes a plurality of semiconductor light sources (11) in serial connection with each other. A circuit arrangement (12a, 12b, 12c) is assigned to and connected in parallel with at least one of the light sources (11), includes a plurality of detectors (13, 15, 16) for detection of a malfunction of the light source (11), and is adapted for bypassing the light source (11) in case of a malfunction of the light source (11). A lighting device (1) of a motor vehicle includes at least one light module (5, 6) for generation of a predefined light distribution.

20 Claims, 2 Drawing Sheets

(56) References Cited

U.S. PATENT DOCUMENTS

Figure 1:
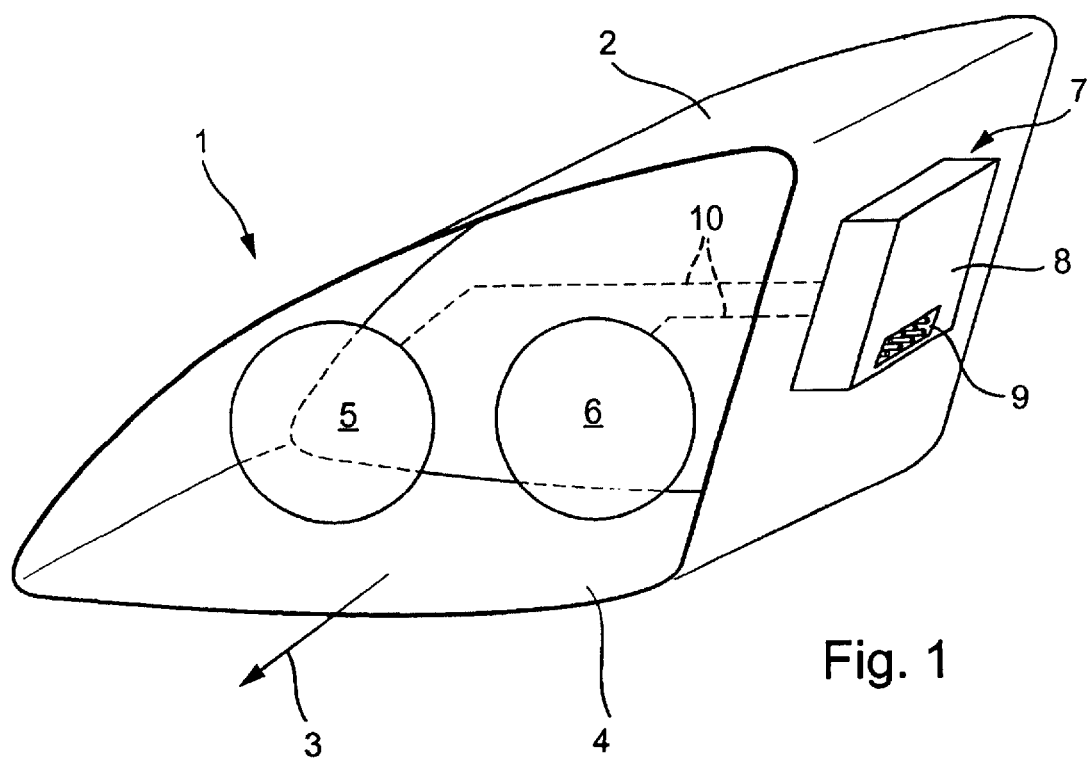

2013/0264942 A1* 10/2013 Kuang et al. .................. 315/77
2014/0265860 A1* 9/2014 Lethellier .................... 315/121

FOREIGN PATENT DOCUMENTS

| DE | 10 2007 024 784 A1 | 11/2008 |
| DE | 60 2004 011 177 T2 | 1/2009 |
| DE | 10 2009 006 250 A1 | 10/2009 |
| DE | 10 2008 031 029 A1 | 1/2010 |
| DE | 10 2009 017 989 A1 | 10/2010 |
| EP | 1 000 806 A2 | 5/2000 |
| FR | 2901956 A1 | 7/2007 |
| WO | 2009138907 A2 | 11/2009 |

OTHER PUBLICATIONS

Apr. 4, 2011 European Search Report for Application No. 10193429.7.

* cited by examiner

LIGHTING DEVICE OF A MOTOR VEHICLE

CROSS-REFERENCE TO RELATED APPLICATION

This application claims priority to and benefit of the filing date of German Patent Application 10 2009 060 791.9 entitled "Light Module for a Lighting Device of a Motor Vehicle as Well as the Lighting Device of a Motor Vehicle with Such a Light Module" and filed on Dec. 22, 2009.

BACKGROUND OF INVENTION

1. Field of Invention

The invention relates, generally, to a lighting device of a motor vehicle and, more specifically, to a light module employed with such a lighting device.

2. Description of Related Art

Light modules and lighting devices are known in various embodiments from the related art. Normally, light-emitting diodes (LEDs) are used as semiconductor light sources. Such lighting devices can be designed as random motor-vehicle lights—in particular, for arrangement on the rear or a side of a motor vehicle. However, the lighting devices can likewise be designed as "LED" headlights, wherein high-performance LEDs are used as semiconductor light sources that provide white or whitish light in sufficient luminous intensity so that the "LED" headlights can generate random light functions—for example, passing-, high-beam-, fog-, static- or dynamic-bending-, town-, country-, expressway-, or other static or adaptive light distributions.

To be able to generate a desired light distribution, several light-emitting diodes connected in series are normally used. In the process, a problem lies in that, in case one of the light-emitting diodes is defective, not only does the defective light-emitting diode no longer emit any light, but an entire branch of light-emitting diodes connected in series no longer functions. The reason for this is seen in that, due to the defective light-emitting diode, the current flow through the branch and light-emitting diodes connected in series is interrupted. This is disadvantageous and problematic in the case of, in particular, lighting devices for motor vehicles—specifically with regard to traffic safety.

Thus, there is a need in the related art for a light module for a lighting device of a motor vehicle a defect of a semiconductor light source of which (as part of a serial connection of several semiconductor light sources) does not immediately lead to failure of an entire branch. More specifically, there is a need in the related art for such a light module as many of the functional semiconductor light sources of the branch of which as possible continue to transmit light in spite of the defect of one or several semiconductor light sources.

SUMMARY OF INVENTION

The invention overcomes the disadvantages in the related art in a light module for a lighting device of a motor vehicle. The light module includes a plurality of semiconductor light sources in serial connection with each other. A circuit arrangement is assigned to and connected in parallel with at least one of the light sources, includes a plurality of detectors for detection of a malfunction of the light source, and is adapted for bypassing the light source in case of a malfunction of the light source. The invention overcomes the disadvantages in the related art also in a lighting device of a motor vehicle that includes at least one light module for generation of a predefined light distribution.

One advantage of the light module for a lighting device of a motor vehicle of the invention is that a defect of a semiconductor light source (as part of a serial connection of several semiconductor light sources) does not immediately lead to failure of an entire branch.

Another advantage of the light module for a lighting device of a motor vehicle of the invention is that as many of the functional semiconductor light sources of the branch as possible continue to transmit light in spite of the defect of one or several semiconductor light sources.

Another advantage of the light module for a lighting device of a motor vehicle of the invention is that it is possible that the remaining non-bypassed semiconductor light sources of the serial connection can continue to be supplied with current and emit light.

Another advantage of the light module for a lighting device of a motor vehicle of the invention is that the light function of the light module can continue to be operated with slight restriction.

Another advantage of the light module for a lighting device of a motor vehicle of the invention is that the light distribution generated by the light module can even meet applicable legal requirements when one or even several semiconductor light sources is/are defective or has/have even failed.

Another advantage of the light module for a lighting device of a motor vehicle of the invention is that the light module does not have to be replaced, even in the case of one or more defective semiconductor light sources.

Another advantage of the light module for a lighting device of a motor vehicle of the invention is that it offers a considerable increase in security, since semiconductor light sources that still function (upon failure of others) continue to emit light and generate the light function of the light module.

Another advantage of the light module for a lighting device of a motor vehicle of the invention is that failure of the entire serial connection is prevented.

Another advantage of the light module for a lighting device of a motor vehicle of the invention is that, in spite of one or more failed semiconductor light sources, a restricted light distribution is generated, which makes possible generation of a light distribution by the light module that fulfills applicable legal requirements.

Another advantage of the light module for a lighting device of a motor vehicle of the invention is that a "memory" protocol with identification and failure time of the defective light source as well as additional information regarding the defect can be prepared and stored, the "error" memory can then be read out at the next repair shop, and the defect or the malfunction of the light source can be detected although the light module still generates the light distribution corresponding to legal requirements.

Another advantage of the light module for a lighting device of a motor vehicle of the invention is that the restricted light distribution generated on the basis of the at least one defective semiconductor light source of the module still fulfills all legal requirements.

Another advantage of the light module for a lighting device of a motor vehicle of the invention is that the restricted light function can make possible a reliable emergency operation of the motor vehicle without deficits in security.

Another advantage of the light module for a lighting device of a motor vehicle of the invention is that it permits a simple serial connection of semiconductor light sources combined with advantages of parallel connection.

Another advantage of the light module for a lighting device of a motor vehicle of the invention is that, if the number of semiconductor light sources in the light module is relatively great, the desired or a slightly restricted light distribution of the light module can be generated with the remaining semiconductor light sources that have not been bypassed.

Other objects, features, and advantages of the invention will be readily appreciated as the same becomes better understood while reading the subsequent description taken in conjunction with the accompanying drawings.

BRIEF DESCRIPTION OF EACH FIGURE OF DRAWING OF INVENTION

Figure 2:
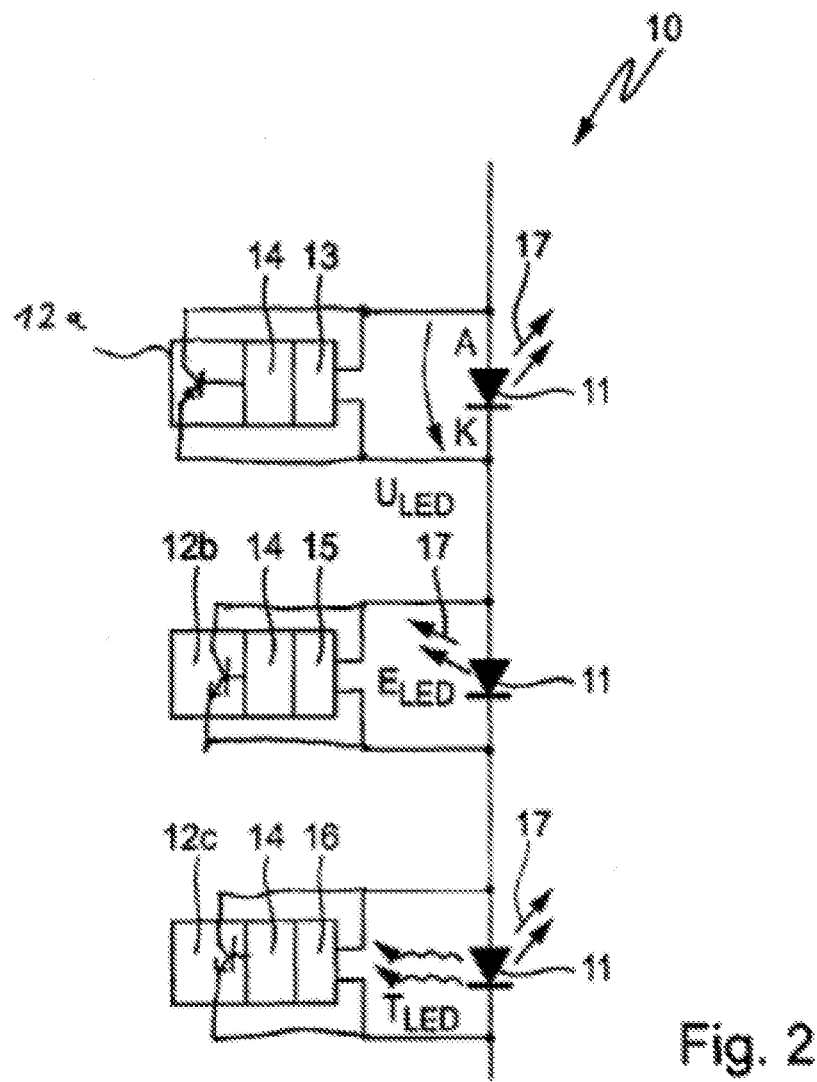

FIG. 1 shows a perspective view of an embodiment of a lighting device of a motor vehicle according to the invention; and FIG. 2 shows a serial connection of several light sources of an embodiment of a light module according to the invention for the lighting device illustrated in FIG. 1.

DETAILED DESCRIPTION OF EMBODIMENTS OF INVENTION

In FIG. 1, an embodiment of a lighting device for motor vehicles according to the invention is generally indicated at 1 in its entirety. The lighting device 1 is designed as a motor-vehicle headlight. Of course, the lighting device 1 can also be designed as a light or the like that is arranged in the rear or laterally on the motor vehicle. The headlight 1 includes a housing 2 that can be made of plastic. The headlight housing 2 includes a light-emission opening in one light-emission direction 3 of the headlight 1 that is sealed by a transparent sealing plug 4 made of colorless plastic or glass. The sealing plug 4 can be designed without optically active profiles (e.g., prisms) as a so-called "clear plug." As an alternative, the sealing plug 4 can also be provided (at least in regions) with optically active profiles, which effect a dispersion of the penetrating light in a horizontal direction.

Two light modules 5, 6 are arranged in the interior of the headlight housing 2. The light modules 5, 6 are in a "fixed" arrangement or "movable" arrangement relative to the housing 2. By a relative movement of the light modules 5, 6 to the housing 2 in a horizontal direction, for example, a dynamic-bending-light function can be realized. In the case of a movement of the light modules 5, 6 around a horizontal axis (thus, in a vertical direction), a "headlight range" control can be realized. The light modules 5, 6 are designed for the generation of a desired light distribution—for example, a/an passing-, high-beam-, town-, country-, expressway-, fog-, static- or dynamic-bending-, or any other static or adaptive light distribution. The light modules 5, 6 generate the desired light function either alone or in combination with one another by superimposing the partial light distributions delivered by each individual light module 5, 6 to the desired total light distribution. The light modules 5, 6 can be designed as "reflection" modules and/or "projection" modules. Of course, more or fewer than the two light modules 5, 6 can be provided.

A controller, generally indicated at 7, is arranged in a controller housing 8 on the exterior of the headlight housing 2. Of course, the controller 7 can be arranged in any other place in the headlight 1. In particular, a separate controller can be provided for each of the light modules 5, 6, wherein the controllers can be a component of the light modules 5, 6. The controller 7 serves the purpose of control and/or regulation of the light modules 5, 6 or partial components of the light modules 5, 6—such as, for example, light sources of the light modules 5, 6. The control of the light modules 5, 6 or partial components by the controller 7 takes place via connecting cables 10 (indicated by a dashed line in FIG. 1). The light modules 5, 6 can also be provided with electric power via the cables 10. The cables 10 are conducted through an opening in the headlight housing 2 into the controller housing 8 and connected there to the circuit of the controller 7. In case several controllers are provided as a component of the light modules 5, 6, the cables 10 and opening in the headlight housing 2 can be omitted.

For better electromagnetic screening, the controller housing 8 is made of an electrically conductive material—in particular, of metal (such as aluminum die cast). Likewise, for better electromagnetic screening, the cables 10 are screened—in particular, by a metal meshwork or metal/plastic meshwork surrounding the cables 10. In addition, an opening is provided in the controller housing 8 in which a plug or socket element 9 is arranged. The controller 7 can be connected to a higher-level controller (for example, a so-called "body controller") and/or power supply of the motor vehicle (for example, a vehicle battery) via the plug or socket element 9.

The light modules 5, 6 of the lighting device 1 use one or more semiconductor light sources as light sources—in particular, light-emitting diodes (LEDs). In the future, "LED" headlights 1 will be used increasingly with the "LED" headlights exhibiting a plurality of LEDs multi-dimensionally arranged in the headlight housing 2. Variable light distributions can be achieved by powering individual LEDs or individual "LED" groups "on" or "off." Such headlights 1 will be referred to as "pixel" or "matrix" headlights. Normally, several LEDs are in serial connection (also referred to as a "branch" or "chain" connection). To prevent the entire "LED" chain from failing in the case of a defect or malfunction of one of the serially connected LEDs when the defective LED fails with an error "Interrupt of Connection," a special design of the light modules 5, 6 is proposed, as explained in more detail below.

FIG. 2 shows a serial connection 10 of several light-emitting diodes 11. Of course, the serial connection 10 can include more or fewer than the three shown light-emitting diodes. In lighting devices with several semiconductor light sources (in particular, "LED" headlights 1), generally several serial connections 10 are provided to generate a desired light distribution of the light module 5, 6. In the embodiment, a circuit arrangement 12a, 12b, 12c is connected in parallel to each of the light-emitting diodes 11. Of course, it is possible that one or more of the circuit arrangements 12a, 12b, 12c is/are connected in parallel to several LEDs 11.

Each of the circuit arrangements 12a, 12b, 12c includes detectors for the detection of a malfunction of the light-emitting diode 11 assigned to it as well as a bypasser for bypassing the light-emitting diode 11 in the case of a detected malfunction of the monitored light-emitting diode 11. In the case of a detected failure of one of the LEDs 11, the defective LED 11 is bypassed by the bypasser. Thus, in case one of the light-emitting diodes 11 fails with an error "Interruption of Connection," the current can flow around the defective light-emitting diode 11 via the circuit arrangement 12a, 12b, 12c assigned to the LED 11 so that the remaining light-emitting diodes 11 of the "LED" chain 10 continue to be supplied with current and can emit light. In this way, the light function of the light module 5, 6 can be maintained at least in a restricted manner, which represents a considerable increase in security in comparison to conventional "LED" lighting devices, in the case of a failure of one LED 11 of an "LED" chain 10 of which all the LEDs 11 of the "LED" chain 10 failed.

In the embodiment, a circuit arrangement 12a, 12b, 12c each has one LED 11 assigned to it. Of course, it should be appreciated by those having ordinary skill in the related art that each circuit arrangement 12a, 12b, 12c has several LEDs assigned to it. In the case of a failure of one of the LEDs 11, the circuit arrangement 12a, 12b, 12c would bypass several LEDs 11. However, in case the total number of light-emitting diodes 11 of the light module 5, 6 is great enough, the light function of the light module 5, 6 even then could still be maintained in a restricted manner.

The restricted light function of the light module 5, 6 can still fulfill the legal requirements in the resulting light distribution in spite of the failure of one or more LEDs 11. This requires a special layout of the number, arrangement, and use of LEDs 11 of the light module 5, 6. To fulfill the legal requirements in spite of the failure of one or more of the LEDs 11, it should be appreciated by those having ordinary skill in the related art that additional precautions are taken. For example, it should be appreciated by those having ordinary skill in the related art that that the light module 5, 6—in the case of the failure of one or more LEDs 11—is horizontally and/or vertically swiveled so that the failure of the LED or LEDs 11 can be compensated. Likewise, change of the position of a "movable diaphragm" arrangement of a "projection" module to compensate the failure of the LED or LEDs 11 should be appreciated by those having ordinary skill in the related art that. In the process, the components already provided for the generation of a dynamic-bending light can be used for "headlight range" control and/or for the generation of an adaptive-light distribution (in the case of a failure of one or more LEDs 11) to change the resulting restricted-light distribution such that the applicable legal requirements in light distribution are still fulfilled.

The circuit arrangements 12a, 12b, 12c shown in FIG. 2 differ from one another in manner and the detectors employed for the detection of a malfunction of the assigned light-emitting diodes 11. Circuit arrangement 12a, for example, includes a voltage-measuring device 13 that monitors the applied voltage "$U_{LED}$" between anode "A" and cathode "K." In addition, circuit arrangement 12a has a processing unit 14—for example, in the form of a programmable microprocessor—that evaluates the observed voltage "$U_{LED}$" and, if necessary, effects the generation of a corresponding function signal. For example, the processing unit 14 ensures that, in the case of an exceeding or falling short of a "voltage" limit by a currently measured value of the monitored voltage "$U_{LED}$" or a "gradient" limit by a determined current "gradient" limit of the observed voltage curve "$U_{LED}$," a malfunction of the light-emitting diode 11 is detected. The "voltage" and "gradient" limits can be pre-defined in advance and stored in a memory. As an alternative to this, it should be appreciated by those having ordinary skill in the related art that the limit during the running operation of the light module 5, 6 is determined by a majority decision via several LEDs 11 of the LED branch 10 or light module 5, 6. In the process, it is assumed that the majority of all LEDs 11 are properly functioning so that they can be used for determination of suitable "voltage" and "gradient" limits.

In the embodiment, the bypassers for bypassing the light-emitting diode 11 are designed as a semiconductor circuit element—in particular, a transistor (not shown in the figure) a switch input of which is actuated in dependency upon the function signals generated by the processing unit 14 of the detectors. Thus, if the processing unit 14 detects a malfunction or defect of the light-emitting diode 11, it outputs a corresponding "'mal' function" signal that causes the transistor of circuit arrangement 12a to interconnect so that the current can flow via the circuit arrangement 12a or the transistor.

In circuit arrangement 12b, the proper function of the LED 11 is determined by an optical-light sensor 15 (also referred to as a "photodiode"). The light sensor records and observes the light intensity "$E_{LED}$" of the light 17 emitted by the light-emitting diode 11. The processing unit 14 is designed or programmed such that it detects a malfunction of the light-emitting diode 11 in case a "light intensity" limit is fallen short of by a current "light intensity" value "$E_{LED}$" or in case a "gradient" limit is exceeded or fallen short by a current "gradient" value of the "light intensity" curve "$E_{LED}$." In case a malfunction of the light-emitting diode 11 is detected, the processing unit 14 causes the generation of a corresponding "'mal' function" signal that then, in the above-described manner, actuates the bypassers for bypassing the light-emitting diode 11—in particular, the transistor. Similar to the manner described above for the voltage, the limits for the light intensity or gradients of the light intensity can be pre-defined or determined and, if necessary, saved.

In the case of circuit arrangement 12c, the proper function of the light-emitting diode 11 is detected by the monitoring of a temperature "$T_{LED}$" of the light-emitting diode 11. To this end, circuit arrangement 12c has a temperature sensor 16 that records the operating temperature "$T_{LED}$" of the light-emitting diode 11. The processing unit 14 is designed or programmed such that a malfunction of the light-emitting diode 11 is detected in case a "temperature" limit is exceeded or fallen short of by a "current temperature" value "$T_{LED}$" or in case a "gradient" limit is exceeded or fallen short of by the "current gradient" value of the "temperature" curve "$T_{LED}$." In the case of a malfunction of the light-emitting diode 11, the processing unit 14 causes the generation of a corresponding "'mal' function" signal that then, in the above-described manner, actuates the bypassers for bypassing the light-emitting diode 11 or transistor. Similar to the manner described above for the voltage, the limits for the temperature or the "temperature" gradients can be pre-defined or determined and, if necessary, saved.

In the embodiment, the sensors 13, 15, 16 are designed in structural unity with the respective assigned semiconductor light sources 11. In the case of circuit arrangement 12a, the voltage "$U_{LED}$" sharply rises in the case of a malfunction of the LED. Such a voltage rise can be detected by the processing unit 14. In the case of circuit arrangement 12b, if the light-emitting diode 11 is functioning properly, the light intensity "$E_{LED}$" is significantly greater than it is in the case of a malfunction of the light-emitting diode 11, where the LED 11 emits practically no light. These high "light intensity" values "$E_{LED}$" can be detected by the processing unit 14. In the case of circuit arrangement 12c, the temperature "$T_{LED}$" of a properly functioning light-emitting diode is significantly higher than that of a defective light-emitting diode 11. The operating temperature of a functional light-emitting diode 11 lies above the ambient temperature—in particular, above 100° C. The temperature of a defective light-emitting diode 11 corresponds to about the ambient temperature, which ranges from −30° C. (in the winter) to +40° C. (at the height of summer). The processing unit can also respond in the case of the exceeding of a limit temperature and, as a result, protect the light-emitting diodes from thermal overload. After falling below a somewhat lower "second limit" temperature (hysteresis-characteristic), the LED is automatically switched "on" again. If the speed of the "on"/"off" powering of the LED is sufficiently high, the thermal protection is not perceptible to the human eye.

Since after start-up of the light module 5, 6 the light-emitting diode 11 requires some time proceeding from the ambient temperature to achieve its operating temperature "$T_{LED}$" (the temperature signaling a proper function of the LED 11), it is advisable to prevent an erroneous detection of a defect of an LED 11 to not begin monitoring the temperature of the light-emitting diode 11 until it has achieved its operating temperature "$T_{LED}$." Depending on the ambient temperature, this can take ten seconds or even a few minutes. The waiting period can be fixed or determined in dependency on the ambient temperature and/or temperature at the beginning of an operating phase of the light module 5, 6.

To prevent a defective light-emitting diode 11 from bringing about a failure of all light-emitting diodes 11 of the LED branch 10 during this waiting period (since its malfunction is not detected during the waiting period), at the end of an operating phase of the light module 5, 6, a current reading of the detectors 13, 15, 16 can be stored in a memory. At the beginning of a subsequent operating phase of the light module 5, 6, the stored readings can be read out from memory and made available to the detectors 13, 15, 16 at least at the beginning of the operating phase during the waiting period. In this way, it is ensured that a light-emitting diode 11, which has already been detected as being defective during the preceding operating phase, is immediately recognized as defective at the beginning of the subsequent operating phase and correspondingly bypassed.

The invention been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A light module for a lighting device of a motor vehicle, said light module comprising:
   a plurality of semiconductor light sources in serial connection with each other;
   a circuit arrangement assigned to at least one of said light sources, said circuit arrangement comprising:
      at least one detector being configured to measure an operating temperature of said at least one of said light sources;
      a processing unit operatively connected to said at least one detector and being configured to determine whether said operating temperature falls below a predetermined limit and output a signal in response to determining that said operating temperature is below said predetermined limit thereby indicating that said at least one of said light sources is malfunctioning; and
      a switching element operatively connected to said processing unit and connected in parallel with said at least one of said light sources and being configured to allow electric current to bypass said at least one of said light sources having said operating temperature below said predetermined limit in response to receiving said signal from said processing unit;
      wherein said processing unit is configured to monitor said operating temperature of said at least one of said light sources during bypass of said at least one of said light sources and to determine whether said at least one of said light sources is no longer malfunctioning by determining whether said operating temperature of said at least one of said light sources rises above said predetermined limit.

2. A light module as set forth in claim 1 wherein said switching element is configured to prevent electric current from bypassing said at least one of said light sources in response to said processing unit determining that said at least one of said light sources is no longer malfunctioning.

3. A light module as set forth in claim 1 wherein said processing unit is configured to determine a current-temperature value relating to operation of said at least one of said light sources.

4. A light module as set forth in claim 1 wherein processing unit is configured to determine a current-gradient value relating to operation of said at least one of said light sources.

5. A light module as set forth in claim 1 wherein said processing unit is configured to monitor measurements of said at least one detector after a specifiable waiting period has expired after start-up of said light module.

6. A light module as set forth in claim 1 further including a memory in communication with said processing unit wherein measurements of said at least one detector are configured to be stored in said memory at an end of an operating phase of said light module and wherein measurements of said at least one detector are configured to be retrieved from said memory by said processing unit at a beginning of a new operating phase of said light module.

7. A light module as set forth in claim 1 wherein said switching element is a semiconductor switching element.

8. A lighting device of a motor vehicle comprising:
   at least one light module for generation of a predefined light distribution and including:
      a plurality of semiconductor light sources in serial connection with each other;
      a circuit arrangement assigned to at least one of said light sources, said circuit arrangement comprising:
         at least one detector being configured to measure an operating temperature of said at least one of said light sources;
         a processing unit operatively connected to said at least one detector and being configured to determine whether said operating temperature falls below a predetermined limit and output a signal in response to determining that said operating temperature is below said predetermined limit thereby indicating that said at least one of said light sources is malfunctioning; and
         a switching element operatively connected to said processing unit and connected in parallel with said at least one of said light sources and being configured to allow electric current to bypass said at least one of said light sources having said operating temperature below said predetermined limit in response to receiving said signal from said processing unit;
         wherein said processing unit is configured to monitor said operating temperature of said at least one of said light sources during bypass of said at least one of said light sources and to output a second signal in response to determining that said at least one of said light sources is no longer malfunctioning.

9. A lighting device as set forth in claim 8 wherein said switching element is configured to prevent electric current from bypassing said at least one of said light sources in response to receiving said second signal from said processing unit.

10. A lighting device as set forth in claim 8 wherein said processing unit is configured to determine a current-temperature value relating to operation of said at least one of said light sources.

11. A lighting device as set forth in claim 8 wherein processing unit is configured to determine a current-gradient value relating to operation of said at least one of said light sources.

12. A lighting device as set forth in claim 8 wherein said processing unit is configured to monitor measurements of said at least one detector after a specifiable waiting period has expired after start-up of said light module.

13. A lighting device as set forth in claim 8 further including a memory in communication with said processing unit wherein measurements of said at least one detector are configured to be stored in said memory at an end of an operating phase of said light module and wherein measurements of said at least one detector are configured to be retrieved from said memory by said processing unit at a beginning of a new operating phase of said light module.

14. A lighting device as set forth in claim 8 wherein said switching element is a semiconductor switching element.

15. A light module for a lighting device of a motor vehicle, said light module comprising:
- a plurality of semiconductor light sources in serial connection with each other;
- a circuit arrangement assigned to at least one of said light sources, said circuit arrangement comprising:
  - at least one detector being configured to measure an operating temperature of said at least one of said light sources;
  - a processing unit operatively connected to said at least one detector and being configured to determine whether said operating temperature falls below a predetermined limit and output a signal in response to determining that said operating temperature is below said predetermined limit thereby indicating that said at least one of said light sources is malfunctioning; and
  - a switching element operatively connected to said processing unit and connected in parallel with said at least one of said light sources and being configured to allow electric current to bypass said at least one of said light sources having said operating temperature below said predetermined limit in response to receiving said signal from said processing unit;
  - wherein said processing unit is configured to monitor said operating temperature of said at least one of said light sources during bypass of said at least one of said light sources and to output a second signal in response to determining that said at least one of said light sources is no longer malfunctioning.

16. A light module as set forth in claim 15 wherein said switching element is configured to prevent electric current from bypassing said at least one of said light sources in response to receiving said second signal from said processing unit.

17. A light module as set forth in claim 15 wherein said processing unit is configured to determine at least one of a current-temperature value and a current-gradient value relating to operation of said at least one of said light sources.

18. A light module as set forth in claim 15 wherein said processing unit is configured to monitor measurements of said at least one detector after a specifiable waiting period has expired after start-up of said light module.

19. A light module as set forth in claim 15 further including a memory in communication with said processing unit wherein measurements of said at least one detector are configured to be stored in said memory at an end of an operating phase of said light module and wherein measurements of said at least one detector are configured to be retrieved from said memory by said processing unit at a beginning of a new operating phase of said light module.

20. A light module as set forth in claim 15 wherein said switching element is a semiconductor switching element.

* * * * *